United States Patent
Kim et al.

(10) Patent No.: US 10,796,831 B2
(45) Date of Patent: Oct. 6, 2020

(54) MAGNETICALLY-RESPONSIVE SURFACE AND METHOD OF MANIPULATING PROPERTIES OF A SURFACE

(71) Applicant: The Board of Trustees of the University of Illinois, Urbana, IL (US)

(72) Inventors: Seok Kim, Champaign, IL (US); Zining Yang, Champaign, IL (US); Jun Kyu Park, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 166 days.

(21) Appl. No.: 16/180,204

(22) Filed: Nov. 5, 2018

(65) Prior Publication Data

US 2019/0139688 A1     May 9, 2019

Related U.S. Application Data

(60) Provisional application No. 62/581,915, filed on Nov. 6, 2017.

(51) Int. Cl.
| | |
|---|---|
| *H01F 7/08* | (2006.01) |
| *G02B 26/02* | (2006.01) |
| *G02B 26/00* | (2006.01) |
| *G02B 1/00* | (2006.01) |
| *B82Y 25/00* | (2011.01) |
| *H01F 41/02* | (2006.01) |

(52) U.S. Cl.
CPC ............. *H01F 7/081* (2013.01); *B82Y 25/00* (2013.01); *G02B 1/005* (2013.01); *G02B 26/02* (2013.01); *G02B 26/023* (2013.01); *G02B 26/007* (2013.01); *H01F 41/02* (2013.01)

(58) Field of Classification Search
CPC ..................................... B82Y 25/00
USPC ..................................... 428/195.1
See application file for complete search history.

(56) References Cited

U.S. PATENT DOCUMENTS

| | | | |
|---|---|---|---|
| 9,610,580 B2 | 4/2017 | Wang et al. | |
| 9,823,465 B2 | 11/2017 | Kim et al. | |
| 2015/0352586 A1 | 12/2015 | Kim et al. | |
| 2018/0100046 A1 | 4/2018 | Kim et al. | |

OTHER PUBLICATIONS

Agapov et al., "Length scale of Leidenfrost ratchet switches droplet directionality", *Nanoscale*, vol. 6, pp. 9293-9299 (2014).
Bai et al., "Direction Controlled Driving of Tiny Water Drops on Bioinspired Artificial Spider Silks," *Advanced Materials*, vol. 22, pp. 5521-5525 (2010).

(Continued)

*Primary Examiner* — Ian A Rummel
(74) *Attorney, Agent, or Firm* — Brinks Gilson & Lione

(57) ABSTRACT

A magnetically-responsive surface structure comprises an array of hybrid microstructures on a substrate, where each hybrid microstructure comprises an elastomeric micropillar attached to the substrate and a rigid tile attached to the elastomeric micropillar. The rigid tiles collectively define a discontinuous, changeable surface. The hybrid microstructures further comprise a ferromagnetic material. The elastomeric micropillars are deflectable under a magnetic field so as to alter an orientation of the rigid tiles, thereby allowing a characteristic of the discontinuous, changeable surface to be manipulated.

20 Claims, 13 Drawing Sheets

(56) References Cited

OTHER PUBLICATIONS

Choi et al., "Large Slip of Aqueous Liquid Flow over a Nanoengineered Superhydrophobic Surface", *Physical Review Letters*, vol. 96, 066001, pp. 1-4 (2006).

Cui et al., "Bioinspired Actuated Adhesive Patterns of Liquid Crystalline Elastomers", *Advanced Materials*, vol. 24, pp. 4601-4604 (2012).

Drotlef et al. "Magnetically Actuated Patterns for Bioinspired Reversible Adhesion (Dry and Wet)", *Advanced Materials*, vol. 26, pp. 775-779 (2014).

Feng et al., "Rachet composite thin film for low temperature self-propelled Leidenfrost droplet," *Journal of Colloid and Interface Science*, vol. 367, pp. 450-454 (2012).

Fudouzi et al., "Photonic Rubber Sheets with Tunable Color by Elastic Deformation,"*Langmuir*, vol. 22, 3, pp. 1365-1368 (2006).

Ge et al., "A Robust Smart Window: Reversibly Switching from High Transparency to Angle-Independent Structural Color Display," *Advanced Materials*, vol. 27, pp. 2489-2495 (2015).

Gillies et al., "Controllable Particle Adhesion with a Magnetically Actuated Synthetic Gecko Adhesive," *Advanced Functional Materials*, vol. 23, pp. 3256-3261 (2013).

Glazer et al., "Multi-Stimuli Responsive Hydrogel Cilia," *Advanced Functional Materials*, vol. 23, pp. 2964-2970 (2013).

Haque et al., "Unidirectional Alignment of Lamellar Bilayer in Hydrogel: One-Dimensional Swelling, Anisotropic Modulus, and Stress/Strain Tunable Structural Color", *Advanced Materials*, vol. 22, pp. 5110-5114 (2010).

Jimenez et al., "Soft optical composites for tunable transmittance", *Extreme Mechanics Letters*, vol. 9, pp. 297-303 (2016).

J.W. Judy, et al., "Magnetically Actuated, Addressable Microstructures," *Journal of Microelectromechanical Systems*, 6 (3), 249-256 (1997).

Keum et al., "Microassembly of Heterogeneous Materials using Transfer Printing and Thermal Processing", *Scientific Reports*, vol. 6, 29925, pp. 1-9 (2016).

Khademolhosseini et al., "Fabrication and Patterning of Magnetic Polymer Micropillar Structures Using a Dry-Nanoparticle Embedding Technique", *Journal of Microelectromechanical Systems*, vol. 22, 1, pp. 131-139 (Feb. 2013).

Kim et al., "Imbricate Scales as a Design Construct for Microsystem Technologies", *Small*, 8, 6, pp. 901-906 (2012).

Kim et al., "Microstructured elastomeric surfaces with reversible adhesion and examples of their use in deterministic assembly by transfer printing", *PNAS*, vol. 107, 40 pp. 17095-17100 (2010).

Kim et al., "Remote Manipulation of Droplets on a Flexible Magnetically Responsive Film," *Scientific Reports*, vol. 5, 17843, pp. 1-10 (2015).

Lee et al., "Tilted Pillars on Wrinkled Elastomers as a Reversibly Tunable Optical Window", *Advanced Materials*, vol. 26, pp. 4127-4133 (2014).

Lin et al., "Mechanically tunable dry adhesive from wrinkled elastomers", *Soft Matter*, vol. 4, pp. 1830-1835 (2008).

Liu et al., "Turning a surface superrepellent even to completely wetting liquids", *Science*, vol. 346, 6213, pp. 1096-1100 (2014).

Marin et al., "Capillary droplets on Leidenfrost micro-ratchets", *Physics of Fluids*, vol. 24, pp. 12201-1-12201-10 (2012).

Nam et al., "Inkjet Printing Based Mono-Layered Photonic Crystal Patterning for Anti-counterfeiting Structural Colors", *Scientific Reports*, vol. 6, 30885, pp. 1-9 (2016).

Park et al., "Droplet manipulation on a structured shape memory polymer surface", *Lab Chip*, vol. 17, pp. 1793-1801 (2017).

Peng et al., "Magnetically Induced Fog Harvesting via Flexible Conical Arrays", *Advanced Functional Materials*, vol. 25, pp. 5967-5971 (2015).

Rotzetter et al., "Micro Mirror Polymer Composite Offers Mechanically Switchable Light Transmittance", *Advanced Engineering Materials*, vol. 16, 7, pp. 878-883 (2014).

Sun et al., "Bioinspired Surfaces with Special Wettability", *Accounts of Chemical Research*, vol. 38, 8, pp. 644-652 (2005).

Wang et al., "Interface Manipulation for Printing Three-Dimensional Microstructures Under Magnetic Guiding", *Small*, vol. 11, 16, pp. 1900-1904 (2015).

Wang et al., "Magnetically Responsive Nanostructures with Tunable Optical Properties", *Journal of the American Chemical Society*, vol. 138, pp. 6315-6323, (2016).

Wu et al., "Three-Level Biomimetic Rice-Leaf Surfaces with Controllable Anisotropic Sliding", *Advanced Functional Materials*, vol. 21, pp. 2927-2932 (2011).

Yang et al., "A Tip-Tilt-Piston Micromirror With an Elastomeric Universal Joint Fabricated via Micromasonry", *Journal of Microelectromechanical Systems*, vol. 24, 2, pp. 262-264 (Apr. 2015).

Yao et al., "Adaptive fluid-infused porous films with tunable transparency and wettability", *Nature Materials*, vol. 12, pp. 529-534 (Jun. 2013).

Yu et al., "Magneto-Controllable Capture and Release of Cancer Cells by Using a Micropillar Device Decorated with Graphite Oxide-Coated Magnetic Nanoparticles", *Small*, vol. 9, 22, pp. 3895-3901 (2003).

Zhao et al., "Bio-inspired variable structural color materials", *Chem. Soc. Rev.*, vol. 41, pp. 3297-3317 (2012).

Zheng et al., "Directional adhesion of superhydrophobic butterfly wings", *Soft Matter*, vol. 3, pp. 178-182 (2007).

Zhu et al., "Real-Time Manipulation with Magnetically Tunable Structures", *Advanced Materials*, vol. 26, pp. 6442-6446 (2014).

FIG. 5A    FIG. 5B
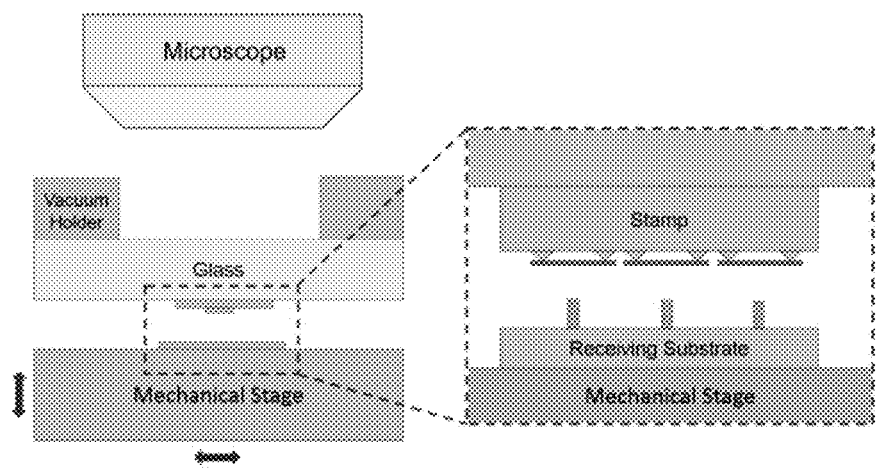
FIG. 6A    FIG. 6B
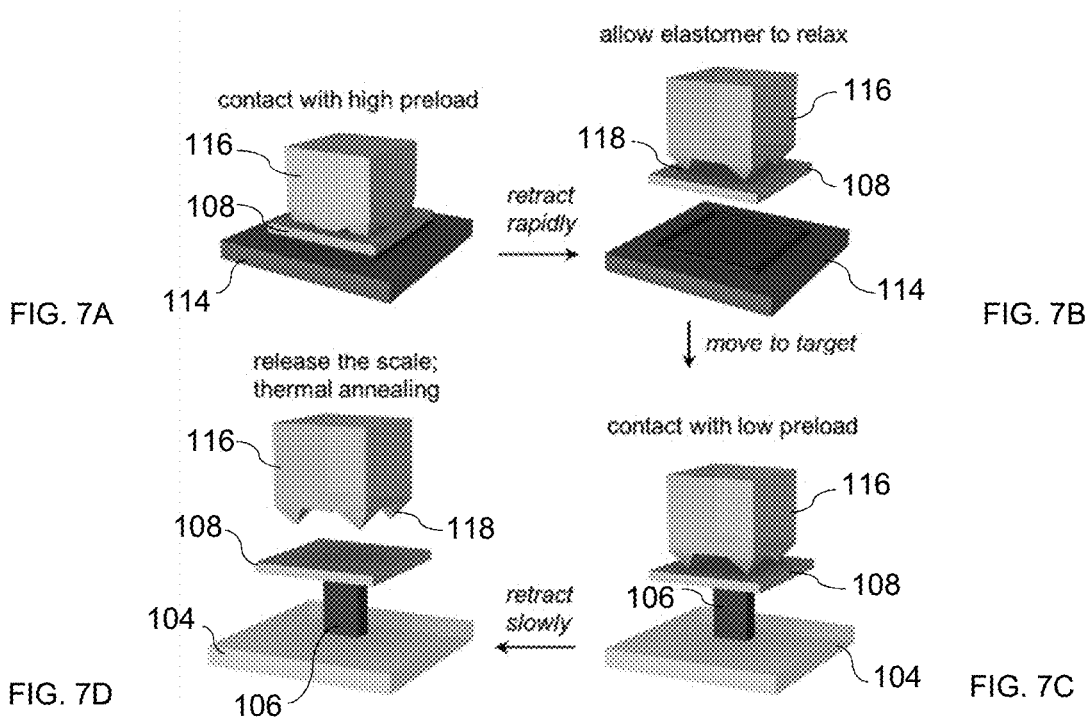
FIG. 7A   FIG. 7B   FIG. 7C   FIG. 7D

MAGNETICALLY-RESPONSIVE SURFACE AND METHOD OF MANIPULATING PROPERTIES OF A SURFACE

RELATED APPLICATION

The present patent document claims the benefit of priority under 35 U.S.C. § 119(e) to U.S. Provisional Patent Application No. 62/581,915, which was filed on Nov. 6, 2017, and is hereby incorporated by reference in its entirety.

STATEMENT REGARDING FEDERALLY SPONSORED RESEARCH OR DEVELOPMENT

This invention was made with government support under CMMI-1-484010-917014-191100 awarded by the National Science Foundation. The government has certain rights in the invention.

TECHNICAL FIELD

The present disclosure is related generally to transfer printed structures and more particularly to a magnetically-responsive surface structure that may be prepared by transfer printing.

BACKGROUND

Micro- and nanoscale structured surfaces found in nature that exhibit changeable properties in response to external stimuli have inspired work to create dynamically-responsive surfaces with tunable properties. The ability to actively control a range of surface properties, such as adhesion, wettability, transparency, reflectance and structural coloration, could have an impact on a number of industrial applications. However, achieving the desired smart-surface functionality and performance has been beyond the reach of existing fabrication approaches, due to the need to integrate complex shapes, hierarchical structures, and/or heterogeneous materials into smart-surface architectures.

BRIEF SUMMARY

A magnetically-responsive surface structure comprises an array of hybrid microstructures on a substrate, where each hybrid microstructure comprises an elastomeric micropillar attached to the substrate and a rigid tile attached to the elastomeric micropillar. The rigid tiles collectively define a discontinuous, changeable surface. The hybrid microstructures further comprise a ferromagnetic material. The elastomeric micropillars are deflectable under a magnetic field so as to alter an orientation of the rigid tiles, thereby allowing a characteristic of the discontinuous, changeable surface to be manipulated.

A method of manipulating properties of a surface comprises providing an array of hybrid microstructures on a substrate, where each hybrid microstructure comprises an elastomeric micropillar attached to the substrate and a rigid tile attached to the elastomeric micropillar. The rigid tiles collectively define a discontinuous, changeable surface. The hybrid microstructures further comprise a ferromagnetic material. A magnetic field is applied to the array such that at least one of the elastomeric micropillars deflects under the magnetic field and an orientation of the attached rigid tile is altered. Thus, a characteristic of the discontinuous, changeable surface may be manipulated.

BRIEF DESCRIPTION OF THE DRAWINGS

FIG. 5A is a schematic illustration of a rigid tile having a rough surface; such a tile may be referred to as a textured tile, or as black silicon in the case of a silicon tile.

FIG. 5B is a schematic illustration of a rigid tile having periodic surface features; such a tile may be referred to as a photonic crystal tile.

FIGS. 6A and 6B show multiple rigid tiles being transfer printed onto an array of elastomeric micropillars in a single step.

FIGS. 7A-7D show steps in an exemplary transfer printing process where where a rigid tile is retrieved from a donor substrate and transferred onto a top surface of a micropillar using an elastomeric stamp.

DETAILED DESCRIPTION

Described herein is a magnetically-responsive surface structure that may be constructed by transfer printing-based deterministic assembly, where building blocks of disparate materials are integrated to form an array of hybrid microstructures whose orientation may be controlled by a magnetic field.

Figure 1A:
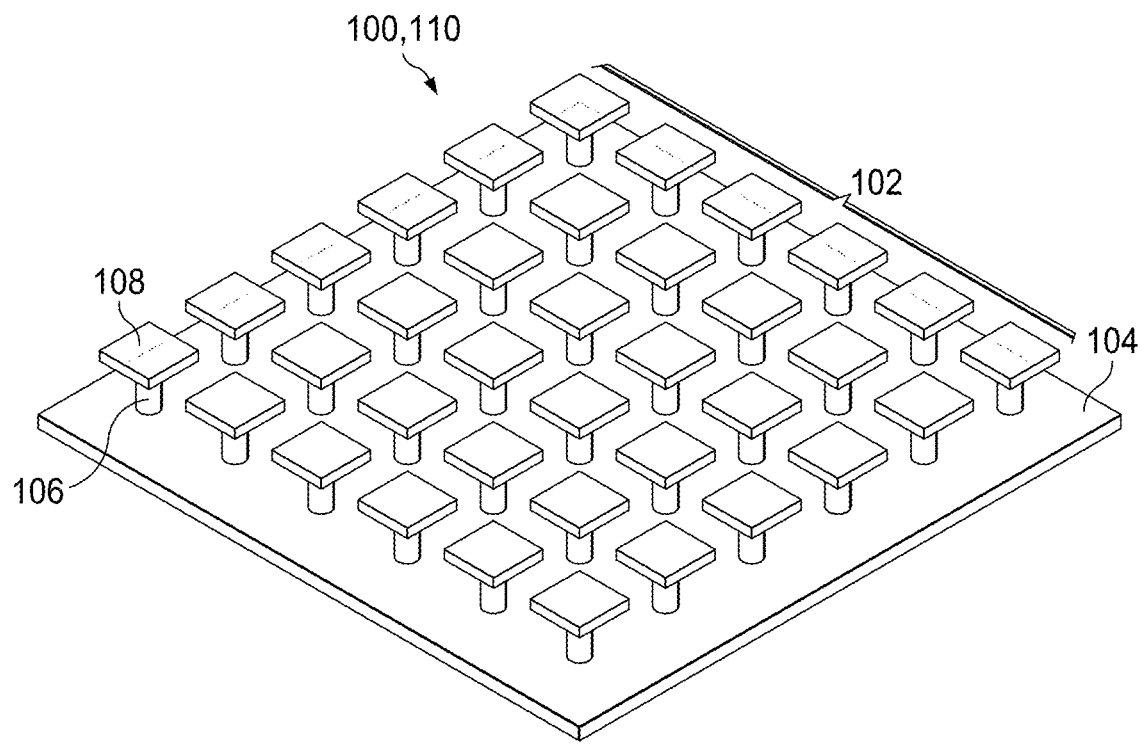
FIG. 1A shows a magnetically-responsive surface structure that includes an array of hybrid microstructures on a substrate, where each hybrid microstructure includes an elastomeric micropillar attached to the substrate and a rigid tile (or "scale") attached to the elastomeric micropillar. The hybrid microstructures further comprise a ferromagnetic material.
Figure 1B:
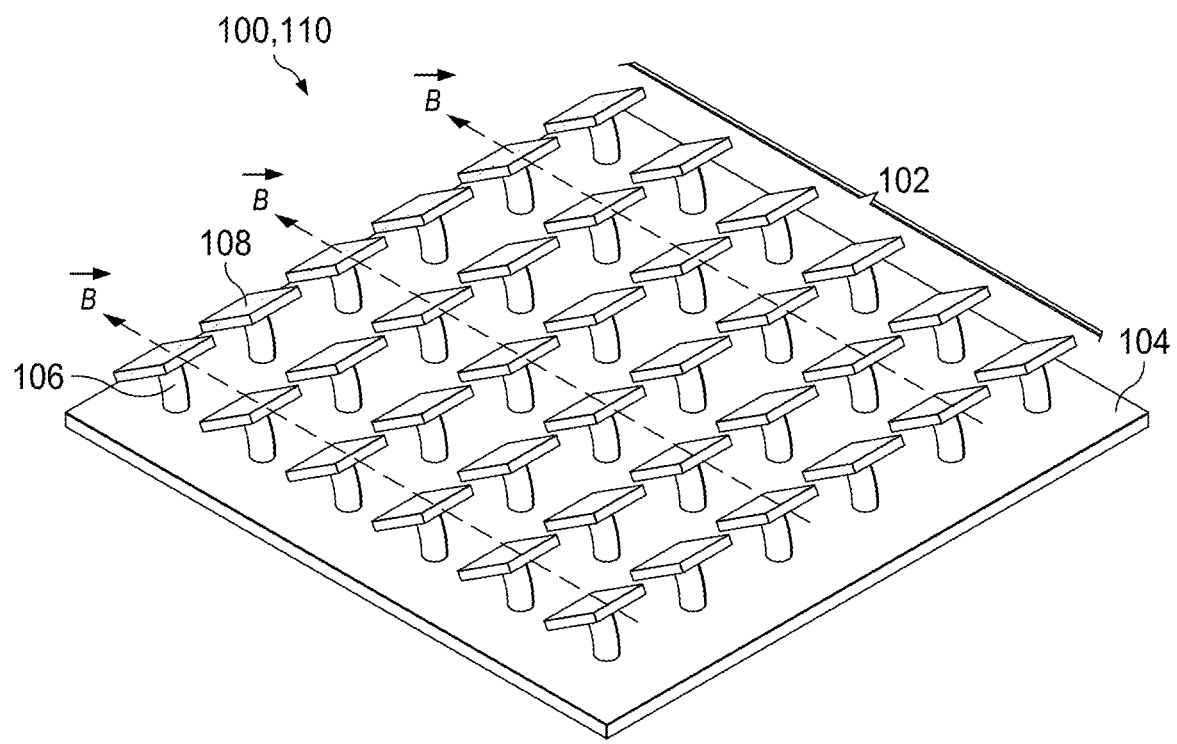
FIG. 1B shows a magnetically-responsive surface structure exposed to a magnetic field, where all of the hybrid microstructures comprise a ferromagnetic material.

Referring to FIG. 1A, a magnetically-responsive surface structure 100 comprises an array of hybrid microstructures 102 on a substrate 104, where each hybrid microstructure 102 includes an elastomeric micropillar 106 attached to the substrate 104 and a rigid tile (or "scale") 108 attached to the elastomeric micropillar 106. The hybrid microstructures 102 comprise a ferromagnetic material. The elastomeric micropillars 106 are deflectable under an applied magnetic field so as to alter an orientation of the attached rigid tiles 108, as illustrated in FIG. 1B. Collectively, the rigid tiles 108 form a discontinuous, changeable surface 110 that may be altered by exposure to a magnetic field, thereby allowing manipulation of a surface characteristic (e.g., wettability, light transmission, adhesion, etc.) and enabling real-time interaction with fluids, light, solid particles and/or living cells. The array of hybrid microstructures 102 may be fabricated on a flexible or rigid substrate 104 by transfer printing, as described below.

The surface structure 100 is magnetically-responsive due to the presence of a ferromagnetic material in and/or on the hybrid microstructures 102. Any hybrid microstructure 102 comprising the ferromagnetic material may be referred to as a magnetic hybrid microstructure 102. The ferromagnetic material may be incorporated into and/or onto the elastomeric pillars and/or the rigid tiles, thereby forming part of the magnetic hybrid microstructures. In one example, magnetic particles comprising the ferromagnetic material may be embedded in the elastomeric micropillars. In another example, a magnetic film comprising the ferromagnetic material may be coated on top and/or bottom surfaces of the rigid tiles or on the elastomeric micropillars. In another example, the rigid tile may be fabricated entirely or in part from the ferromagnetic material. Suitable ferromagnetic materials may comprise iron, nickel, cobalt, gadolinium, samarium, and/or dysprosium. Preferably, the ferromagnetic material is a hard magnetic material such as barium ferrite, strontium ferrite, neodymium iron boron, samarium cobalt, a cobalt-nickel-manganese-phosphor alloy and/or an iron-aluminum-nickel-cobalt alloy (Alnico).

Depending on the application, the array may further include one or more nonmagnetic hybrid microstructures 112 which do not comprise a ferromagnetic material. Accordingly, the array may include both magnetic and nonmagnetic hybrid microstructures 102,112, as shown for example in FIG. 1C. In other examples, such as that shown in FIG. 1B, each hybrid microstructure 102 within the array comprises a ferromagnetic material and thus is magnetically-responsive. As used herein, when the term "hybrid microstructure" is not preceded by the descriptor "magnetic" or "nonmagnetic," the term may be understood to refer to either or both magnetic and nonmagnetic hybrid microstructures.

Figure 2A:
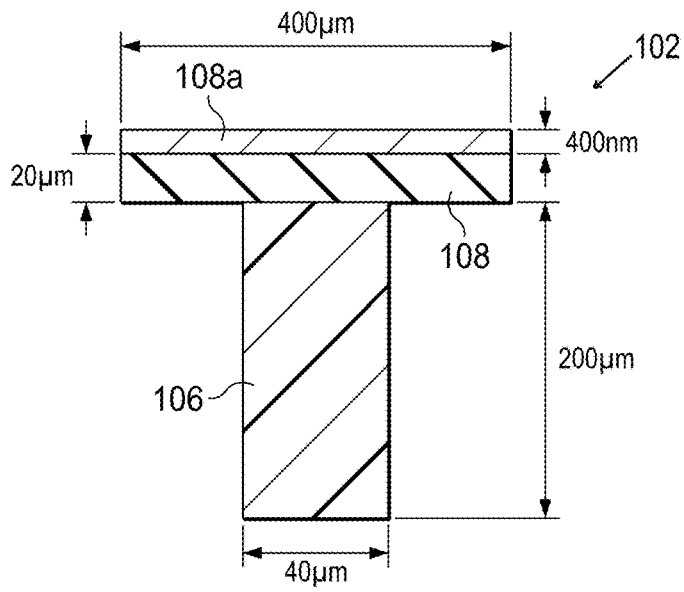
FIGS. 2A and 2B show cross-sectional and isometric views of an exemplary magnetic hybrid microstructure that includes a rigid tile coated with a ferromagnetic material.
Figure 2B:
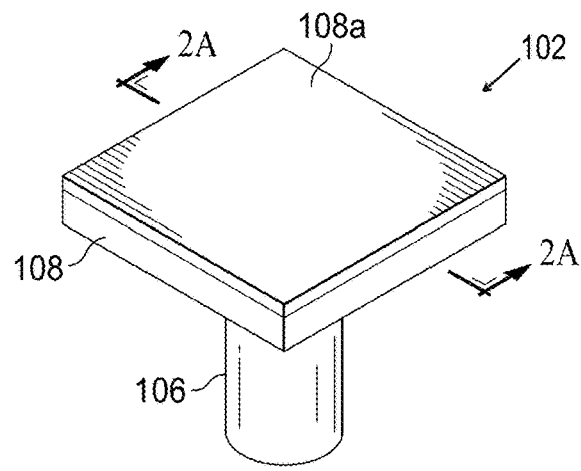
Figure 2C:
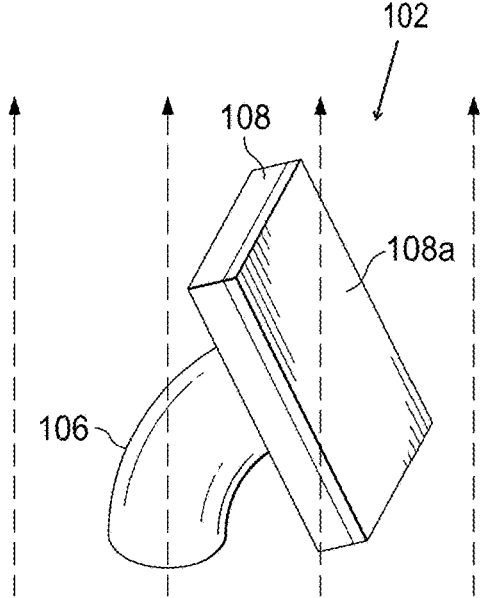
FIG. 2C shows the magnetic hybrid microstructure of FIGS. 2A and 2B in response to an applied magnetic field.

FIGS. 2A and 2B show cross-sectional and isometric views of an exemplary magnetic hybrid microstructure that includes a rigid tile coated with a ferromagnetic material. To fabricate such hybrid microstructures, a thin ferromagnetic layer may be deposited (e.g., by sputtering) onto a top and/or bottom surface of a rigid tile prior to assembly. The ferromagnetic layer may be a continuous, patterned, and/or discontinuous ferromagnetic layer. Typically, the ferromagnetic layer has a thickness in a range from 10 nm to about 1 micron, and more typically from about 100 nm to 500 nm. In one example, the ferromagnetic layer may be a continuous layer of about 400 nm in thickness, as illustrated in FIG. 2B, and the rigid tile may be about 20 µm in thickness. The coated rigid tile may then be transfer printed onto an elastomeric pillar, which in one example may be about 200 µm in height and 40 µm in diameter. The resulting hybrid microstructure may deflect in response to a magnetic field, as shown schematically in FIG. 2C.

Figure 1C:
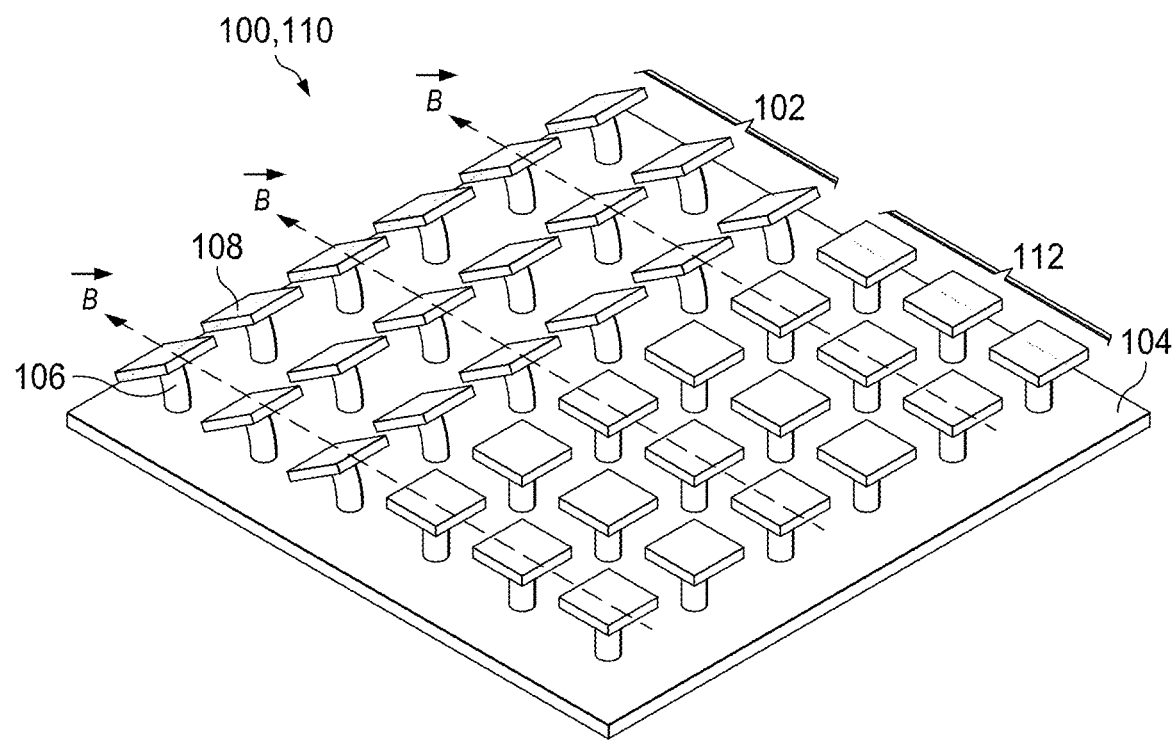
FIG. 1C shows a magnetically-responsive surface structure exposed to a magnetic field, where not all of the hybrid microstructures comprise a ferromagnetic material.
Figure 1D:
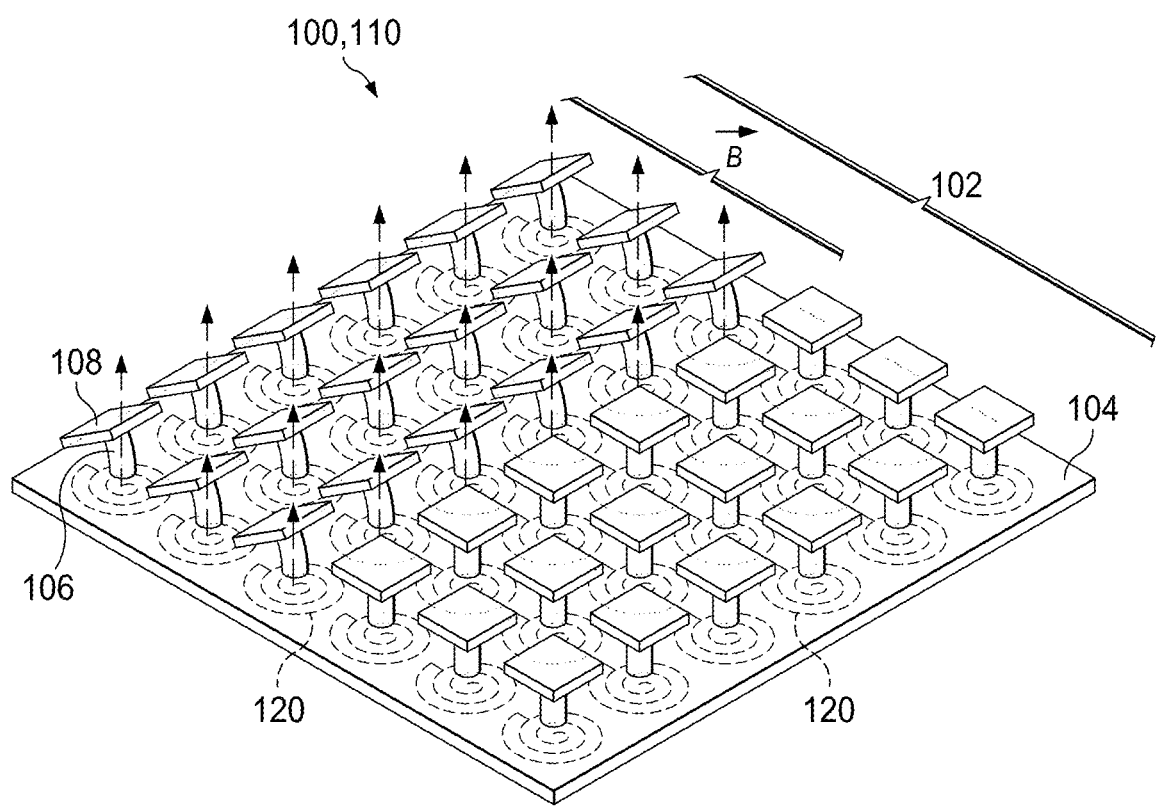
FIG. 1D shows a magnetically-responsive surface structure where an array of electromagnets is positioned in a one-to-one correspondence with the magnetic hybrid microstructures, thereby being capable of actuating the magnetic hybrid microstructures individually, as illustrated.

The hybrid microstructures 102 may be magnetically actuated by a permanent magnet or an electromagnet. For example, a permanent magnet or an electromagnet placed beneath the substrate may induce a magnetic field as indicated in FIG. 1B, thereby collectively actuating the hybrid microstructures 102 in the array. Alternatively, the hybrid microstructures may be individually addressable or actuatable. For example, an array of microscale magnets (e.g., electromagnets) 120 may be positioned in a one-to-one correspondence with the hybrid microstructures 102, thereby being capable of actuating the hybrid microstructures 102 individually, as illustrated in FIG. 1D. In such a case, the array of magnets may be positioned directly above or below the substrate, or may be embedded within the substrate. The achievable tilting angle with a permanent magnet may be significant (>45°), while deflection with an electromagnet typically lies in a range of a few degrees (<10° or <5°).

The array, which includes magnetic and optionally non-magnetic hybrid microstructures 102,112, may be a one- or a two-dimensional array. In one example, the array is a periodic array including a uniform arrangement of the hybrid microstructures, as shown for example in FIGS. 1A-1C. Alternatively, the array may be a random array including a nonuniform arrangement of the hybrid microstructures. The array can include as few as two and as many as hundreds or thousands of the hybrid microstructures. For example, arrays ranging in size from 2 to 10,000 hybrid microstructures may be fabricated. The array may be a square array, a rectangular array, or an array of another shape suitable for defining a magnetically-responsive surface structure.

Figure 3A:
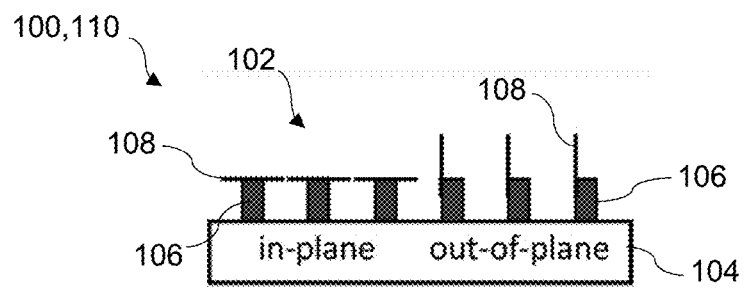
FIG. 3A shows a magnetically-responsive surface structure including hybrid microstructures fabricated in an "in-plane" configuration (left-hand side of figure) and in an "out-of-plane" configuration (right-hand side of figure).

As shown in the left-hand side of FIG. 3A, the as-fabricated hybrid microstructure 102 may include the rigid tile 108 supported on a top surface of the elastomeric micropillar 106. In this case, the rigid tile 108 is oriented at a non-zero angle with respect to a longitudinal axis of the elastomeric micropillar 106 when in the as-fabricated or undeformed state. For example, the rigid tile 108 may be oriented normal to (i.e., at a 90° angle to) the longitudinal axis of the elastomeric micropillar 106. Because an area of the rigid tile 108 is greater than a transverse cross-sectional area of the elastomeric micropillar 106, the rigid tiles 108 may overhang the elastomeric micropillars 106 in a mushroom-like configuration. This as-fabricated tile orientation may be referred to as an "in-plane" orientation.

Alternatively, the rigid tiles 108 may be attached to side surfaces of the elastomeric micropillar 106, as shown in the right-hand side of FIG. 3A. In this case, the rigid tiles 108 may be aligned with a longitudinal axis of the elastomeric micropillars 106. This as-fabricated tile orientation may be referred to as an "out-of-plane" orientation.

Figure 3B:
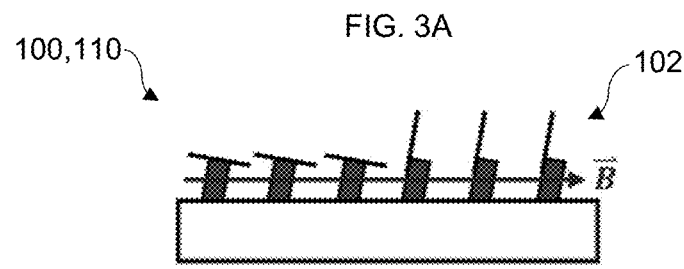
FIG. 3B shows the magnetically-responsive surface structure of FIG. 3A while exposed to a horizontal magnetic field.

These different tile orientations (in-plane versus out-of-plane) may be obtained depending on transfer printing parameters, such as the degree of shearing during printing, and the geometry of the top surface of the elastic micropillars 106, as discussed below. In either case, when a magnetic field is applied to the array including in-plane and/or out-of-plane rigid tiles 108, the elastomeric micropillars 106 may deflect, thereby altering the orientation of the attached rigid tiles 108 with respect to the underlying substrate 104, as illustrated in FIG. 3B for application of a horizontally-directed magnetic field. The preferred as-fabricated tile orientation (in-plane versus out-of-plane) may depend on the intended application for the magnetically-responsive surface structure.

The hybrid microstructures 102 may be spaced closely enough such that adjacent tiles 108 having the in-plane orientation are in contact (e.g., edge-to-edge) and the discontinuous surface 110 created by the collection of rigid tiles 108 may appear to be continuous in the as-fabricated state. Alternatively, the hybrid microstructures 102 may be spaced apart such that the tiles 108 in the in-plane orientation are not in contact and the discontinuous surface 110 appears to be discontinuous, even without an applied magnetic field.

Figure 4A:
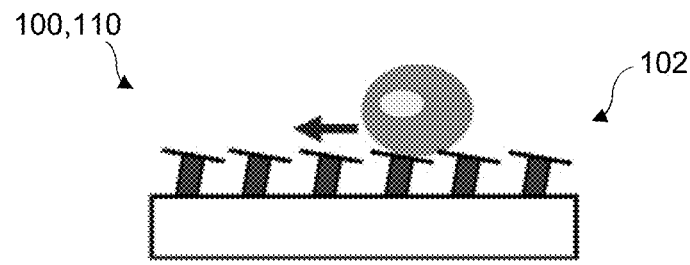
FIG. 4A shows a side view schematic of an array of hybrid microstructures including in-plane rigid tiles exposed to a magnetic field such that the elastomeric pillars tilt away from a normal direction to the substrate, thereby altering the orientation of the attached rigid tiles and allowing a droplet on the discontinuous surface to be manipulated.
Figure 4B:
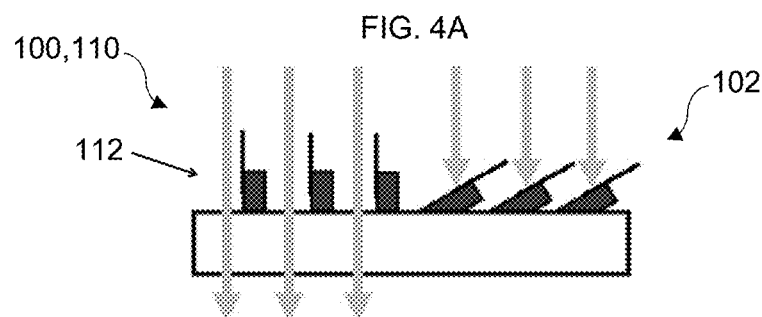
FIG. 4B shows hybrid microstructures including out-of-plane rigid tiles, where only the hybrid microstructures on the right-hand side of the schematic include a ferromagnetic material; thus, upon exposure to a magnetic field, the hybrid microstructures on the left-hand side of the schematic remain in their as-fabricated orientation, allowing for light transmission, while the hybrid microstructures on the right-hand side are tilted, preventing light transmission.
Figure 4C:
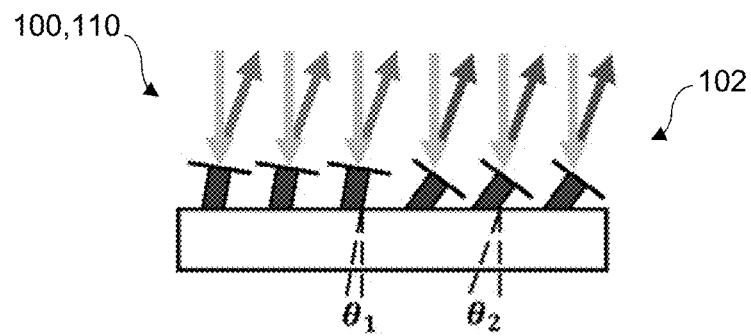
FIG. 4C shows hybrid microstructures including in-plane rigid tiles tilted to differing degrees during exposure to a magnetic field, thereby allowing for differences in the apparent color of the magnetically-responsive surface.

By changing the orientation of the rigid tiles 108, either individually or collectively, the surface characteristics of the discontinuous surface 110 may be manipulated. For example, FIG. 4A shows a side view schematic of an array of hybrid microstructures 102 exposed to a magnetic field such that the elastomeric pillars tilt or bend away from a normal direction to the substrate 104, thereby altering the orientation of the attached rigid tiles and allowing a droplet on the discontinuous surface 110 to be manipulated. In the schematic of FIG. 4B, which includes out-of-plane rigid tiles, only the hybrid microstructures 102 on the right-hand side of the schematic include a ferromagnetic material; thus, upon exposure to a magnetic field, the hybrid microstructures 112 on the left-hand side of the schematic remain in their as-fabricated orientation, allowing for light transmission, while the hybrid microstructures 102 on the right-hand side of the schematic are tilted, preventing light transmission. In the schematic of FIG. 4C, the hybrid microstructures 102 are tilted to differing degrees during exposure to a magnetic field, thereby allowing for differences in the apparent color of the magnetically-responsive surface. The differences in the amount of tilting or bending can be attributed to differing orientations of the ferromagnetic material and/or to selective magnetic actuation of the hybrid microstructures, as discussed below.

The elastomeric micropillars may comprise an elastomer, which is a flexible polymer that can undergo extensive elastic deformation and typically has a low Young's modulus (e.g., less than 1 GPa, or less than 0.1 GPa). Suitable elastomers may include natural or synthetic polymers such as silicone elastomers (e.g., polydimethylsiloxane (PDMS)), polyurethane elastomers, natural rubber, polyethylene-vinyl acetate (PEVA), and/or butyl rubber.

In contrast, the rigid tiles may comprise a stiff material, such as a material having a Young's modulus greater than about 10 GPa, or greater than about 50 GPa. A preferred material for the rigid tiles is silicon. Depending on the intended application for the magnetically-responsive surface structure, the rigid tiles may be processed to have a smooth surface, a rough or textured surface, or a patterned surface that includes periodic surface features (e.g., patterned indentations or protrusions). A rigid tile having a smooth surface may be referred to as a bare or reflective tile (e.g., bare silicon); a rigid tile having a rough surface, as shown schematically in FIG. 5A, may be referred to as a textured tile (or as black silicon in the case of a silicon tile); and a rigid tile having periodic surface features, as shown schematically in FIG. 5B, may be referred to as a photonic crystal tile.

The array of hybrid microstructures may be formed by transfer printing-based deterministic assembly, which may be referred to as transfer printing, where the rigid tiles are transferred onto and attached to the elastomeric micropillars in a stamping process. Additional pre-transfer steps may include fabrication of the elastomeric micropillars on a receiving substrate, and fabrication of the rigid tiles on a donor substrate. To ensure attachment of the rigid tiles to the elastomeric micropillars upon transfer printing, the elastomeric micropillars may comprise a partially uncured polymer prior to coming into contact with the rigid tiles. After assembly, a curing step involving heat, light or a chemical curing agent may be carried out to secure the rigid tiles to the elastomeric micropillars. In some cases, such as when silicon tiles and PDMS micropillars are employed, attachment of the tiles to the micropillars may be effected by a surface hydroxyl condensation reaction. Also or alternatively, an adhesive may be employed.

Transfer printing-based deterministic assembly has been described in detail in U.S. patent application Ser. No. 16/024,123, entitled "Microassembly of Heterogeneous Materials," filed Jun. 29, 2018, in U.S. patent application Ser. No. 15/657,487, entitled "Transfer Printing Using Shape Memory Polymers," filed Jul. 24, 2017, and in U.S. Patent Application Publication No. 2015/0352586, entitled "Microscale Stamp with Reversible Adhesion for Transfer Printing," published Dec. 10, 2015. All of the aforementioned patent documents are hereby incorporated by reference in their entirety.

The use of transfer printing to fabricate a magnetically-responsive surface including hybrid microstructures comprising rigid tiles and elastomeric micropillars is described below in reference to FIGS. 6A-7B. In one example, the rigid tiles may be silicon tiles and the elastomeric micropillars may be embedded with ferromagnetic nanoparticles, but the process is more generally applicable (e.g., to rigid tiles comprising materials other than silicon, to other implementations of the ferromagnetic material, etc.). Prior to transfer printing, the elastomeric micropillars with or without embedded ferromagnetic nanoparticles may be fabricated by a modified replica molding process as described below in reference to FIGS. 23A-23C. Silicon tiles having three different types of surfaces, including bare silicon, black silicon, and photonic crystal tiles as defined above, are prepared as described below in reference to FIGS. 24 and 25. The tiles are fabricated to be easily retrievable by weakly tethering to an underlying substrate using delicate photoresist anchors (e.g., about 1 μm wide and about 1 μm thick) around their periphery, as shown in FIG. 26.

A magnetically-responsive surface structure may be formed by transfer printing rigid tiles onto elastomeric micropillars in a serial or parallel transfer printing process. For example, as illustrated in FIGS. 6A and 6B, multiple rigid tiles may be transfer printed onto an array of micropillars in a single transfer printing step to cover an area extending over several square millimeters or larger (e.g., 2.5 mm by 2.5 mm area or larger), which may be referred to as a small building unit. A large-area magnetically-responsive surface structure can be formed from these smaller building units by repetitive transfer printing in a sequential manner.

A close-up view of an exemplary transfer printing process is provided in FIGS. 7A-7D, where a rigid tile 108 is retrieved from a donor substrate 114 and transferred onto a top surface of a micropillar 106 using an elastomeric stamp 116. In this example, the elastomeric stamp 116 includes pyramidal microtips 118. The soft, elastomeric stamp 116 may be pressed against the rigid tile 108 under high preload such that the microtips 118 are collapsed and nearly full-area contact is established, as illustrated in FIG. 7A. Rapid peeling of the stamp 116 fractures the photoresist anchors, while the tile 108 intimately adheres to the stamp 116, as shown in FIG. 7B. Next, the retrieved tile 108 is brought into gentle contact with a micropillar 106, as illustrated in FIG. 7C, and then the stamp 116 is retracted slowly, such that the tile 108 is "printed" onto the micropillar 106. Here, contact is made between the tile 108 and a top surface or tip of a micropillar 106, where the corresponding contact area may be about 50 times smaller than the surface area of the tile 108. Thus, using a stamp 116 having microtips 118, as opposed to a flat contacting surface, may be advantageous for the transfer, as an extremely low adhesion state facilitates release of the tile 108. The collapsed microtips 118 pop back to their original pyramidal shape as the preload is released, delaminating the tile 108 from the stamp 116 everywhere except for the apexes of the microtips 118, as illustrated in FIG. 7D. This reversible change between microtip collapse and relaxation conditions effectively switches the adhesion of the stamp 116 between strong and weak states. Bonding between the rigid tiles and the elastomeric micropillars may be obtained through curing, an adhesive, and/or a surface hydroxyl condensation reaction, as mentioned above.

Figure 8:
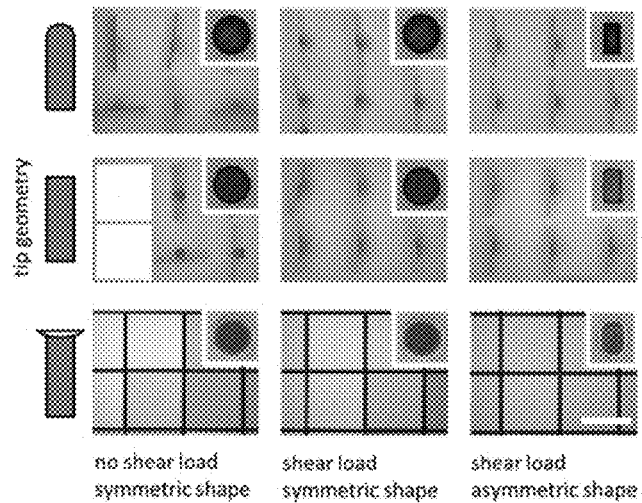
FIG. 8 shows the relationship between as-fabricated tile orientation and tip geometry and the degree of shearing during printing.

A small modification of the fabrication procedure may permit the 3D configuration of the assembled hybrid microstructures to be controlled without additional sophisticated fabrication steps. Depending on the top surface or tip geometry of the micropillars and/or the degree of shearing during transfer printing, the tiles may either stay in-plane or be induced to adopt an out-of-plane configuration, as illustrated in FIG. 3A, which was discussed above. The top surface of the micropillars may have a rounded or flat shape, or another geometry. In this example, micropillars terminating in round, flat, and mushroom-like tips are investigated, as illustrated in FIG. 8.

Figure 9:
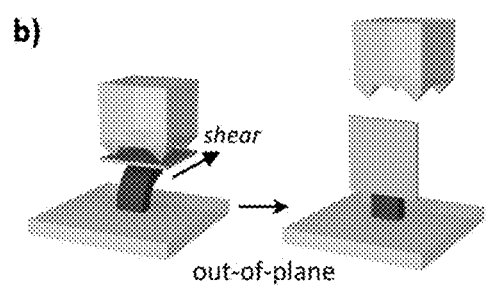
FIG. 9 illustrates how the out-of-plane configuration can be achieved with shear loading during printing.

The round tip may trigger the out-of-plane configuration, as a rigid tile can easily rotate along the curved surface of the tip and attach to a side wall of the micropillar during transfer printing. Shear loading during printing may also help to facilitate achievement of the out-of-plane configuration, as illustrated in FIG. 9. A flat but asymmetric pillar cross-section (e.g., a rectangular cross-section) may promote an out-of-plane configuration and also offer control over the orientation of the printed tiles. In contrast, mushroom-like tips may prevent the tiles from rotating and enable the in-plane configuration. The results of various conditions are summarized in FIG. 8, showing that both in-plane and out-of-plane configurations can be consistently achieved by adopting proper loading and geometric parameters.

Now that a magnetically-responsive surface including an array of hybrid microstructures has been described, along with a method of fabricating the surface, a method of manipulating the properties of the magnetically-responsive surface structure is set forth.

The method includes providing an array of hybrid microstructures on a substrate, where each hybrid microstructure comprises an elastomeric micropillar attached to the substrate and a rigid tile attached to the elastomeric micropillar. The hybrid microstructures further comprise a ferromagnetic material, and thus may be referred to as magnetic hybrid microstructures. Collectively, the rigid tiles define or form a discontinuous, changeable surface, as described above. In other words, the collection of rigid tiles constitutes the discontinuous, changeable surface. A magnetic field is applied, and at least one, some, or all of the elastomeric micropillars deflect under the magnetic field so as to alter an orientation of the rigid tiles. Thus, a characteristic of the discontinuous, changeable surface—such as light transmission, adhesion, wettability, or apparent coloration—may be manipulated.

The magnetic field may be applied collectively to the array, which may be described as collective actuation of the hybrid microstructures, or individually to one or more selected hybrid microstructures in the array, which may be described as individual or selective actuation of the hybrid microstructures. The magnetic field may be applied using a permanent magnet or an electromagnet. As described above in reference to FIG. 1B, a permanent magnet or an electromagnet placed beneath the substrate or in another location may collectively actuate the hybrid microstructures in the array. As indicated in FIG. 1C, the array may further include one or more nonmagnetic hybrid microstructures that are not responsive to the applied magnetic field; in such a case, when the array is exposed to the magnetic field, only the magnetic hybrid microstructures deflect in response. Alternatively, the magnetic hybrid microstructures may be individually actuated by an array of microscale magnets (e.g., electromagnets) positioned below or embedded within the substrate in a one-to-one correspondence with the hybrid microstructures, as illustrated schematically in FIG. 1D.

Providing the array of hybrid microstructures on the substrate may comprise forming the array of hybrid microstructures on the substrate by transfer printing, as described above. The hybrid microstructures may have any of the characteristics described elsewhere in this disclosure.

Figure 10:
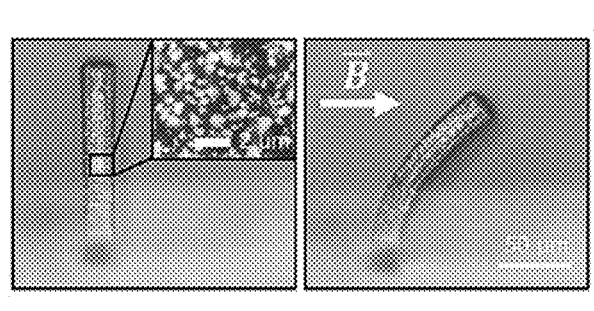
FIG. 10 shows an elastomeric micropilar including embedded ferromagnetic particles with (right image) and without (left image) an applied magnetic field.

The actuation of elastomeric micropillars including embedded ferromagnetic nanoparticles is characterized experimentally by placing an array of the micropillars near a 2.5×2.5×1.25 cm neodymium permanent magnet (K&J Magnetics, Pipersville, Pa.). The magnetic field strength experienced by the micropillars is calculated using an online calculator provided by the vendor, given the distance from the magnet and the orientation ($\alpha$) of the field. The mechanical deflection of a micropillar is defined as the angle between a micropillar and the magnetic field at the tip of the micropillar, and it is measured by analyzing side view images of a micropillar, as shown for example in FIG. 10.

Figure 11A:
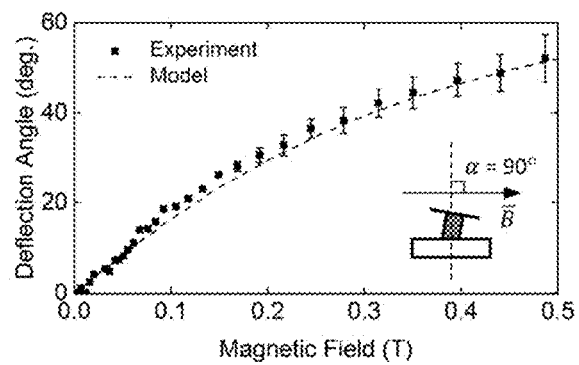
FIG. 11A shows deflection angle as a function of applied magnetic field for an elastomeric micropillar with embedded ferromagnetic particles.
Figure 11B:
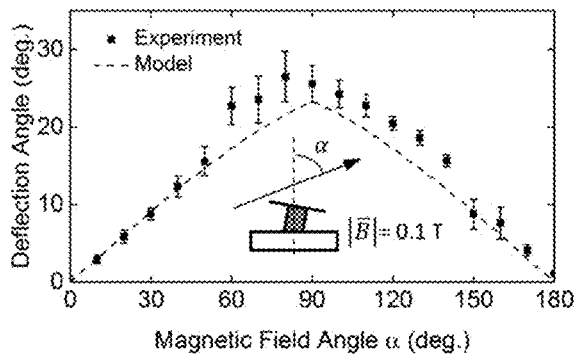
FIG. 11B shows deflection angle as a function of magnetic field orientation for an elastomeric micropillar with embedded ferromagnetic particles.

The deflection of a micropillar versus the magnitude of an orthogonal magnetic field ($\alpha=90°$) is plotted in FIG. 11A. As expected, the higher the magnetic field, the larger the deflection. In addition, the deflection of a micropillar as a function of the magnetic field orientation is measured under a fixed magnetic field, shown in FIG. 11B. The ferromagnetic particle-embedded micropillars exhibit the maximal deflection when the direction of an external magnetic field is nearly orthogonal to the micropillar. The observed magneto-mechanical characteristics of the elastomeric micropillars are modeled, as described in detail in the priority document U.S. Provisional Patent Application No. 62/581,915, which was incorporated by reference above, to approximate the correlation between an applied magnetic field and the resulting deflection angle of the micropillars. The modeled results are shown via the dotted lines in FIGS. 11A and 11B.

Tunable Wettability and Fluid Manipulation

Figure 12A:
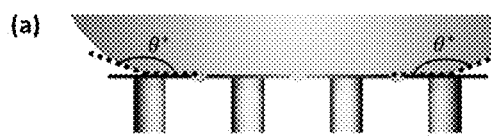
FIGS. 12A and 12B illustrate how a magnetically-responsive surface structure can allow tunable surface wettability and droplet manipulation.
Figure 12B:
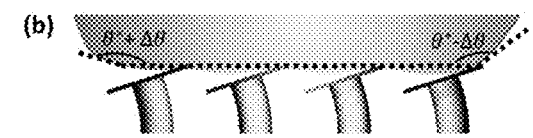

FIGS. 12A and 12B demonstrate how a magnetically-responsive surface structure can allow tunable surface wettability and droplet manipulation. In this example, the magnetically-responsive surface structure comprises black silicon tiles printed onto ferromagnetic particle-embedded micropillars in the in-plane configuration. Thus, the surface structure has a two-level hierarchical architecture created by the overhanging tiles plus the nanostructures on the tiles and exhibits several beneficial features.

First, a re-entrant shape may be formed by printing tiles on top of the micropillars since the area of a rigid tile (e.g., 390 µm by 390 µm) is much larger than the tip of a micropillar (e.g., 40 µm by 80 µm). Thus, a droplet may be more stably suspended on the discontinous changeable surface (e.g., on the collection of rigid tiles) than on an array of micropillars without the rigid tiles, because the recesses or air pockets beneath the overhanging portions of the tiles may effectively prevent a droplet from wetting sidewalls of the micropillars, as can be seen from FIG. 12A.

Figure 13:
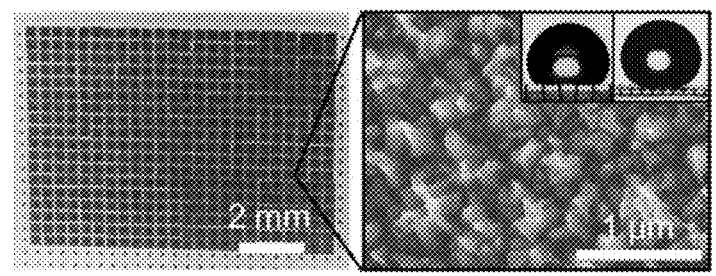
FIG. 13 shows a top view of an array of black silicon tiles where conical nanostructures on the rough surface are visible in the magnified image on the right; the impact on surface wettability is demonstrated in the inset.

Second, a black silicon tile (or another rigid tile having a significant surface roughness or nanostructuring) may be highly superhydrophobic and thus "slippery"; in this example, these characteristics may be due to the presence on the surface of conical nanostructures coated with a hydrophobic monolayer (perfluorodecyltrichlorosilane, or FDTS), as shown in FIG. 13. Accordingly, the apparent contact angle of a water droplet on the discontinuous surface is over 170°, and a droplet easily rolls off when the surface is tilted only 5°. Due in large part to the nanostructuring of the individual tiles, the mobility of the droplets may be extremely high, which enables easy transportation of droplets on the magnetically-responsive surface structure.

Third, the orientation of the rigid tiles may be switched between symmetric (FIG. 12A) and asymmetric (FIG. 12B) configurations by an external magnetic field in real-time. Without a magnetic field, the micropillars stay in the as-fabricated upright position and the tiles align horizontally. This configuration, which may be referred to as the "flat state," leads to the nondirectional wetting of a droplet, as all of the rigid tiles are horizontal. In contrast, the application of a magnetic field causes the formation of a ratchet-like surface due to the deflection of micropillars, as illustrated in FIG. 12B. In this configuration, which may be referred to as the "ratchet state," the surface exhibits directional wettability since all of the rigid tiles are tilted (non-horizontal).

Fluid manipulation, such as directional liquid spreading, droplet self-propulsion, and droplet trapping, are demonstrated on a magnetically-responsive surface structure including hybrid nanostructures. The micropillars may include embedded ferromagnetic particles, as in the examples below, but the ferromagnetic material may alternatively be incorporated into the hybrid nanostructures in other ways (e.g., as a coating on the tiles, as a coating on the micropillars, etc.) as discussed previously.

Figures 14A, 14B, 15A, 15B:
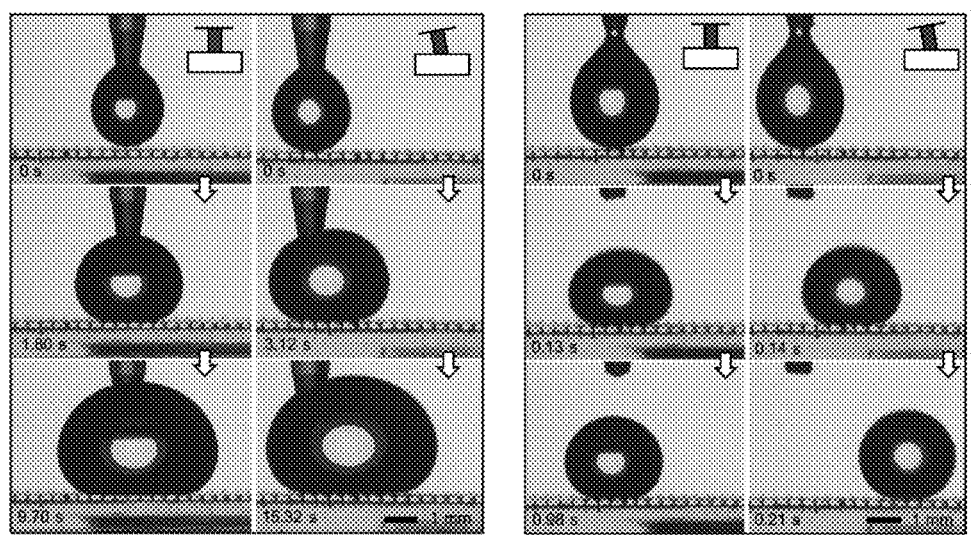
FIG. 14A shows droplet spreading on a "flat state" surface.
FIG. 14B shows droplet spreading on a "ratchet state" surface.
FIG. 15A shows a droplet dispensed on a flat state surface and remaining stationary.
FIG. 15B shows motion of a dispensed droplet on a ratchet state surface.

In one example, dynamic switching between directional and nondirectional liquid spreading can be achieved. A deionized (DI) water droplet with an initial volume of 5 µL is placed on a discontinuous changeable surface defined by a collection of rigid tiles on elastomeric micropillars, and its volume is increased up to 50 µL at a rate of 2 µL/s. On the flat state surface, as shown in FIG. 14A, the droplet tends to spread symmetrically as its volume increases, while on the ratchet state surface, as shown in FIG. 14B, the droplet consistently spreads preferentially to the right. This result reveals the asymmetric wettability of the discontinuous surface in the ratchet state.

Figure 16:
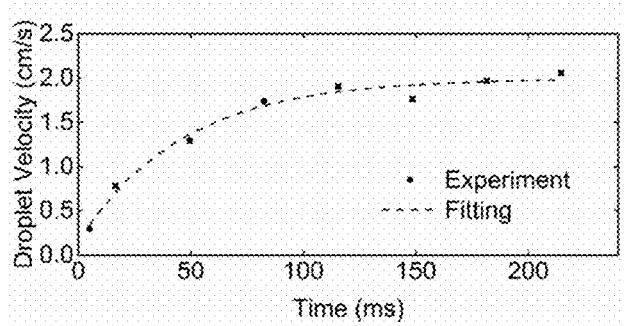
FIG. 16 shows droplet velocity as a function of time for a self-propelling droplet, such as that shown in FIG. 15B.

In another example, a self-propelling droplet on the ratchet state surface is achieved. As a control experiment, a 15 µL DI water droplet is first dispensed on the flat state surface. The droplet stays stationary due to the lack of driving force, as shown in FIG. 15A. Next, another droplet is gently dispensed on the ratchet state surface. Once released, the droplet quickly accelerates and moves to the right, as shown in FIG. 15B. Further experiments demonstrate that a droplet may be trapped in an equilibrium location where the array of hybrid nanostructures forms a symmetric shape. For example, a droplet dispensed on the left side of the surface may initially self-propel to the right, slow down, go back to the left, and eventually stay at the equilibrium location. FIG. 16 shows a velocity versus time curve for a self-propelling droplet. The driving force to self-propel a droplet is modeled by accounting for the Laplace pressure difference experienced by a droplet, as described in detail in the priority patent document, U.S. Provisional Patent Application No. 62/581,915, which was incorporated by reference above.

Provided below are additional examples of droplet manipulation on a magnetically-responsive surface structure, where the ferromagnetic material takes the form of a magnetic coating on the rigid tiles, and magnetic actuation of the hybrid structures is carried out selectively using embedded microcoils, as shown schematically in FIG. 1D.

Figure 17:
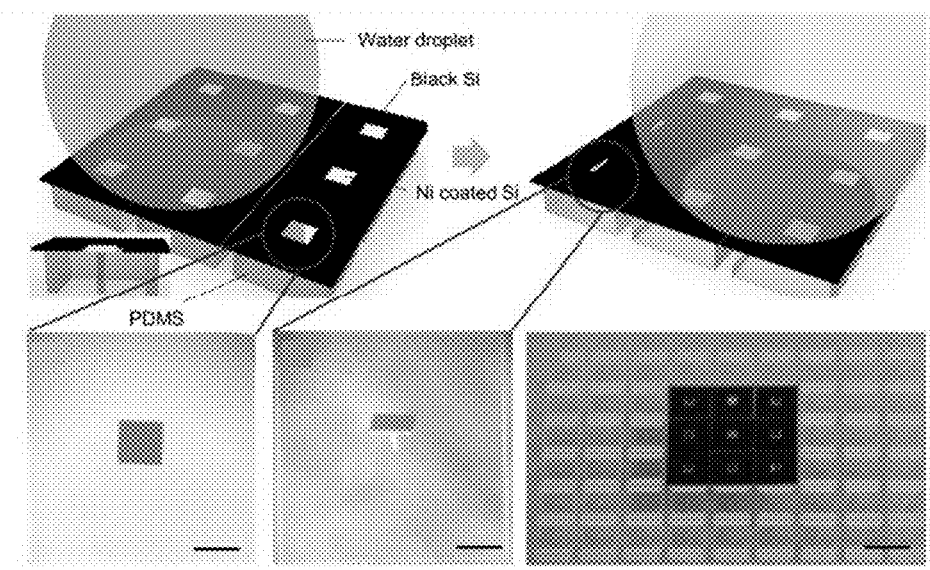
FIG. 17 show schematics of droplet manipulation on a magnetically-responsive surface structure including both magnetic and nonmagnetic hybrid microstructures.

In one example, textured tiles (e.g., black silicon tiles) without a ferromagnetic layer can be prepared and transfer-printed onto elastomeric (e.g., PDMS) micropillars, forming nonmagnetic hybrid microstructures, and rigid tiles including a ferromagnetic layer (e.g., nickel-coated silicon tiles) may be transfer printed onto other micropillars, forming magnetic hybrid microstructures. In this example, the magnetic hybrid microstructures are at the center of an arrangement of nonmagnetic hybrid microstructures, as illustrated in FIG. 17. After being coated with trichloro(1H,1H,2H,2H-perfluorooctyl)silane, the black silicon tiles become superhydrophobic and can strongly repel a water droplet; only the nickel-coated silicon tiles can hold a water droplet, as depicted in the left-side image of FIG. 17. When a magnetic field is selectively applied to the magnetic hybrid microstructures located below the droplet, the orientation of the nickel-coated silicon tiles changes and the water droplet is propelled toward the opposite direction, as depicted in the right-side image of FIG. 17.

Figure 18A:
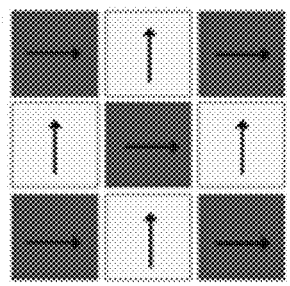
FIG. 18A is a top view schematic of an array of rigid tiles including ferromagnetic layers of orthogonal magnetizations.
Figure 18B:
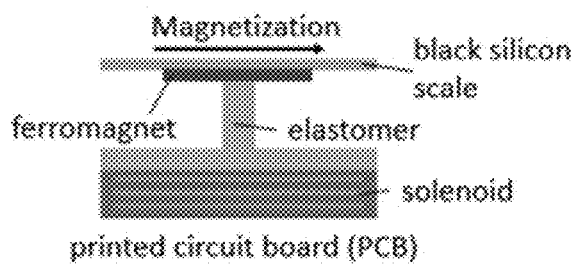
FIG. 18B shows a rigid tile attached to a elastomeric micropillar and coated with a ferromagnetic layer having a particular magnetization; an electromagnet is embedded in the substrate underlying the hybrid microstructure.
Figure 18C:
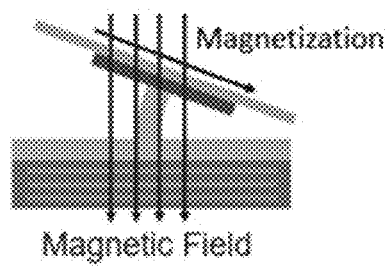
FIG. 18C shows the hybrid microstructure of FIG. 18B under an applied magnetic field.

In another example, a magnetically-responsive surface structure is formed from an array of magnetic hybrid microstructures where each rigid tile includes a ferromagnetic layer having a magnetization orthogonal to the adjacent rigid tile, such that the collection of tiles forms a chess board-like configuration of orthogonal magnetizations, as shown in FIG. 18A. The rigid tiles (e.g., black silicon tiles) are attached to elastomeric micropillars molded on a substrate (e.g., a printed circuit board (PCB)) including embedded electromagnets, as shown in FIG. 18B for a single hybrid microstructure. The embedded electromagnets may comprise an array of solenoids having a one-to-one correspondence with the magnetic hybrid nanostructures. When a magnetic field is applied, the rigid tile can tilt in one of two ways, depending on the direction of the applied magnetic field (e.g., up or down), as illustrated in FIG. 18C.

Figure 19A:
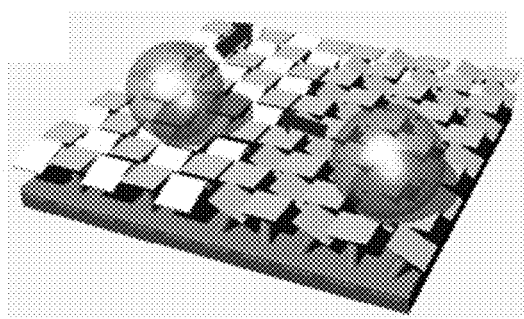
FIGS. 19A and 19B show droplet motion on a magnetically-responsive surface structure where the magnetic hybrid microstructures are selectively actuated.
Figure 19B:
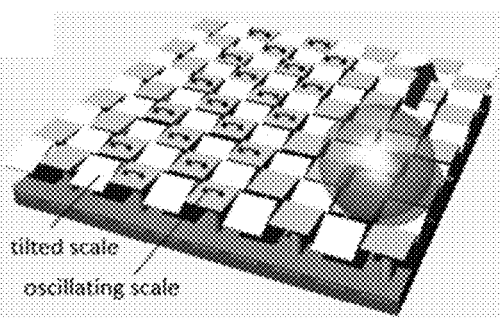

Using this scheme, depending on which hybrid microstructure is tilted, a droplet can move by what is referred to as the Laplace pressure gradient in either direction, as depicted in FIGS. 19A and 19B. This two-directional motion can further be superimposed to enable droplet motion in other directions. Multiple droplets can be manipulated independently by controlling individual hybrid microstructures by activating the corresponding solenoid. It is worthwhile to note that a droplet may require external energy input along with the Laplace pressure gradient to initiate its motion. This external energy could be provided by dispensing a droplet from above, vibrating the entire substrate, or oscillating the non-tilted scale array.

Both of the above-described approaches may be another new type of digital microfluidics (DMF) platform within the Fakir regime and without relying on electrowetting. The Fakir regime, where a droplet sits on a solid-gas heterogeneous surface, is favorable for self-cleaning, anti-fouling, and droplet manipulation. By exploiting a magnetically-responsive surface, the droplets may be driven and manipulated mechanically, not electrically, thereby eliminating issues of high electrical field and possibly biofouling involved in common electrowetting-based DMF. However, the above-described approaches still exhibit rapid, flexible, programmable, and reconfigurable droplet manipulation capabilities, similarly to electrowetting-based DMF.

Tunable Optical Properties and Light Manipulation

Figure 20:
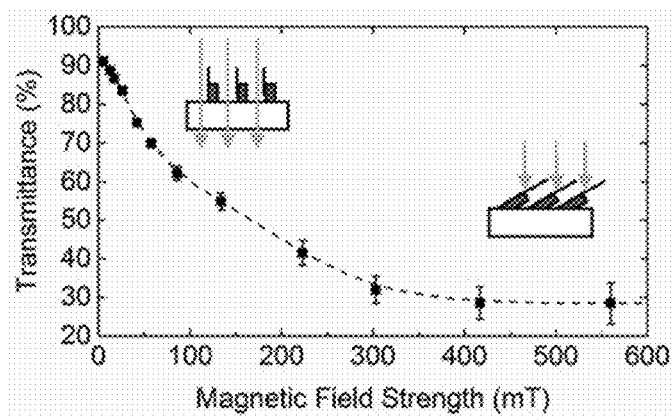
FIG. 20 shows light transmittance as a function of magnetic field strength and, correspondingly, orientation of the rigid tiles.

Magnetically-responsive surface structures with tunable optical properties, such as transmittance and structural coloration, may be constructed by assembling rigid tiles on magnetic micropillars in an out-of-plane configuration. The micropillars may include embedded ferromagnetic particles, but the ferromagnetic material may alternatively be incorporated into the hybrid nanostructures in other ways (e.g., as a coating on the rigid tiles, as a coating on the micropillars, etc.) as discussed previously. Without a magnetic field, all of the elastomeric micropillars and rigid tiles stay in the upright (as-fabricated) position, rendering the magnetically-responsive surface structure almost transparent since incident light may transmit between the micropillars, as illustrated in the left inset of FIG. 20. On the other hand, an external magnetic field induces the elastomeric micropillars to bend, hence the tiles to tilt, resulting in a relatively opaque surface, as shown in the right inset of FIG. 20. Here, the rigid tiles act as microscale shutters that may prevent light from transmitting. The transmittance of the magnetically-responsive surface structure is measured for a white light using optical microscopy and image processing when the hybrid microstructures are upright and deflected. The normalized optical transmittance of the magnetically-responsive surface may be continuously tuned between 30% and 90% in response to an external magnetic field, as shown by the data of FIG. 20. To further broaden the light wavelength to block, smooth rigid tiles (e.g., bare silicon tiles) may be coated with a (reflective) metal layer prior to being assembled onto the micropillars.

Figures 21A, 21B:
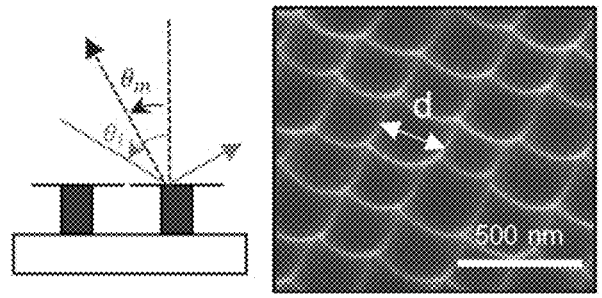
FIG. 21A shows a schematic of photonic crystal tiles in the in-plane orientation.
FIG. 21B shows a scanning electron microscope (SEM) image of a surface of a photonic crystal tile.
Figure 22:
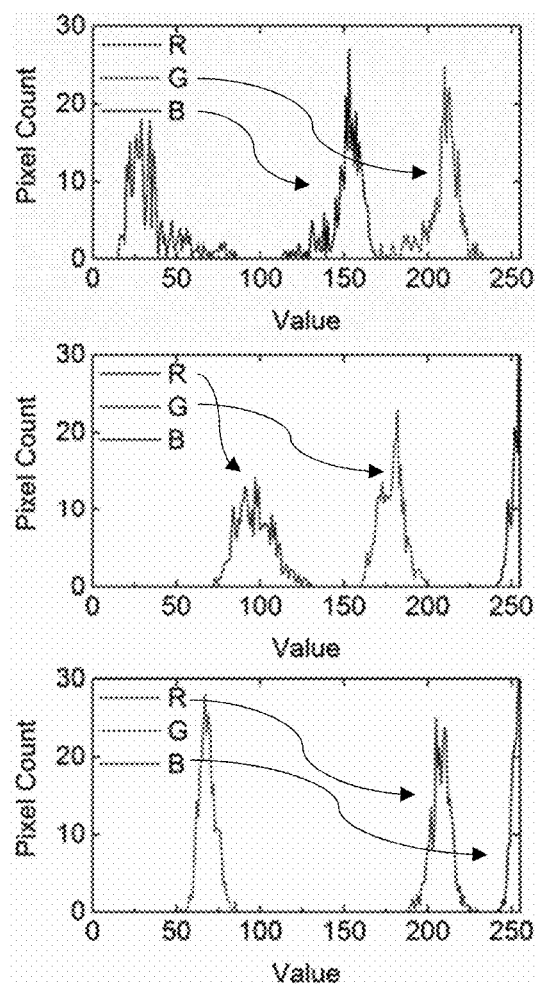
FIG. 22 shows plots of pixel count for red, blue and green pixels for regions of a magnetically-responsive surface including photonic crystal tiles in response to an external magnetic field of 0.1 T (top), 0.2 T (middle), and then 0.3 T (bottom).

In another example, a magnetically-responsive surface with tunable structural coloration may be constructed by assembling photonic crystal tiles on elastomeric micropillars in the in-plane configuration as shown in FIG. 21A. The elastomeric micropillars in this experimental example include embedded ferromagnetic particles, but the ferromagnetic material may alternatively be incorporated into the hybrid nanostructures in other ways (e.g., as a coating on the tiles, as a coating on the micropillars, etc.) as discussed previously. The top surface of the photonic crystal tiles is engraved to include periodic nanoscale cavities with a period d of 300 nm, as shown in FIG. 21B. The real-time switchable structural color of the surface is demonstrated in FIG. 22, which shows plots of the pixel count for red, blue and green pixels for given regions of the magnetically-responsive surface in response to an external magnetic field of 0.1 T (top), 0.2 T (middle), and then 0.3 T (bottom). As the magnetic field is increased, the structural color of the collection of tiles shifts vividly from green to blue and then to purple. As expected, the intensity of both red and blue channels increases, whereas the intensity of green channel decreases with the increasing magnetic field, consistent with the color change sequence (from green to purple) which is observed for the magnetically-responsive surface structure. During the experiments, both the collimated incident light source (a white LED) and the camera are fixed in predefined positions. The observed structural coloration is theoretically explained by adopting classical diffraction theory, as discussed in the priority document, U.S. Provisional Patent Application No. 62/581,915, which was incorporated by reference above.

EXAMPLES

Example 1. Fabrication of Templates for Micropillars

Figures 23A, 23B, 23C:
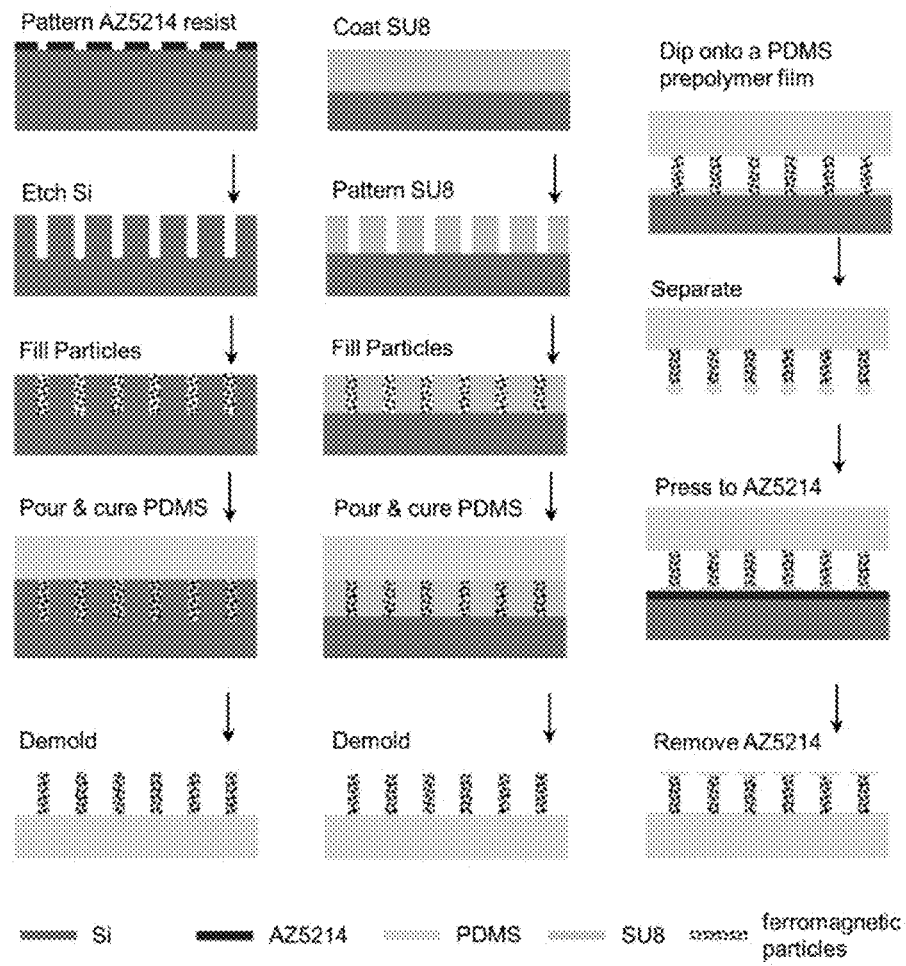
FIG. 23A shows an approach to fabricating micropillars with rounded tips.
FIG. 23B shows an approach to fabricating micropillars with flat tips.
FIG. 23C shows an approach to fabricating micropillars with an inverted mushroom-like tip geometry.

Micropillars with round, flat, or mushroom-like tip geometries may be fabricated by replica molding. Two types of templates are fabricated for different micropillar tip geometries. The first type of template for round-tip micropillars is fabricated on a silicon wafer (UniversityWafer, Inc.) by patterning a photoresist (SPR220, 4.5 µm thick) and then etching 150 µm deep microholes into the silicon wafer by a deep-reactive-ion-etching (DRIE) which provides a round surface profile at the bottom of the microholes, as shown in FIG. 23A. The second type of template for flat-tip micropillars is fabricated by patterning a thick layer of photocurable epoxy (150 µm thick, SU8 50, MicroChem Corp.) on a silicon wafer, such that the bottom surfaces of microholes have a flat topography defined by the silicon wafer surface, as shown in FIG. 23B. Both types of templates are functionalized by trichlorosilane (Sigma-Aldrich, Inc.).

Example 2. Fabrication of Micropillars with Controlled Tip Geometries

Referring again to FIGS. 23A and 23B, ferromagnetic strontium ferrite particles (Hoosier Magnetics, Inc.) are dispersed over the templates and guided into the microholes by a neodymium permanent magnet (K&J Magnetics, Inc.). Excess particles outside the microholes are removed by swabs. Polydimethylsiloxane (PDMS) prepolymer (10:1 mixing ratio, Sylgard 184, Dow Corning) is cast on the templates and allowed to infiltrate into the microholes to encompass the particles. Next, the templates are placed on a permanent magnet such that the magnetic particles can align along the axial direction of the microholes. The template is heated in an oven at 60° C. for 2 h, after which a PDMS sheet with flat- or round-tip magnetic micropillars is peeled off from the template.

To estimate the amount of ferromagnetic material (strontium ferrite in this example) in the micropillars, energy-dispersive x-ray spectroscopy (EDS) is used. The elemental composition of strontium and iron in the micropillar is measured to be about 40 wt. %, and the estimated volume fraction of the magnetic material in the micropillar is about 11%.

Mushroom-like micropillars are derived from flat-tip micropillars by dipping and pressing, as shown in FIG. 23C. First, flat-tip micropillars are dipped into a thin film of PDMS prepolymer (10:1 mixing ratio, spin-coated at 3000 rpm), after which a small droplet of prepolymer remains at the flat tip of each pillar. Then, the dipped micropillars are pressed onto a flat photoresist layer (AZ5214, 1.5 µm) coated on a silicon wafer and cured on a 60° C. hotplate for 10 min. Removing the photoresist by acetone releases the micropillars capped with (inverse) mushroom-like tips.

Example 3. Fabrication of Black Silicon Surfaces

Figure 24:
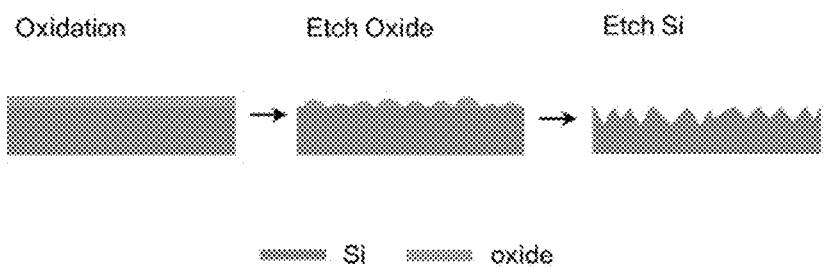
FIG. 24 illustrates a three-step process to forming black silicon tiles.

A black silicon surface is formed on the top silicon layer of a silicon on insulator (SOI) wafer (Ultrasil Corp.) by a three-step process, as shown schematically in FIG. 24. The process (Oxford ICP RIE) begins with a passivation of silicon ($O_2$ gas 10 sccm, $RF_1$ 120 W, $RF_2$ 200 W, 90 mTorr, 5 min), during which a thin oxide layer is formed. Next, the oxide layer is incompletely etched ($CHF_3$ gas 12 sccm, $RF_1$ 300 W, $RF_2$ 500 W, 90 mTorr, 2 min) to yield randomly scattered oxide islands. These oxide islands are used as hard masks for subsequent silicon etching ($Cl_2$ gas 20 sccm, Ar gas 4 sccm, $RF_1$ 300 W, $RF_2$ 500 W, 90 mTorr, 20 min), after which nanoscale conical structures are formed on the surface of the silicon.

Example 4. Fabrication of Photonic Surfaces

Figure 25:
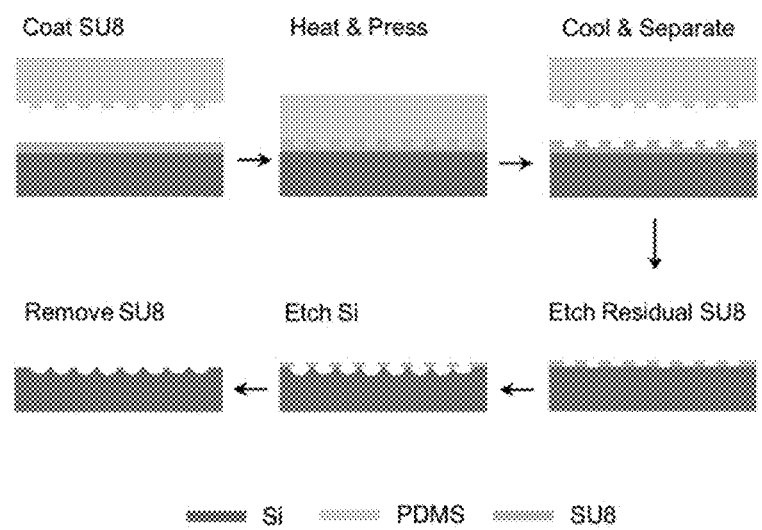
FIG. 25 illustrates a multi-step process to forming photonic crystal tiles.
Figure 26:
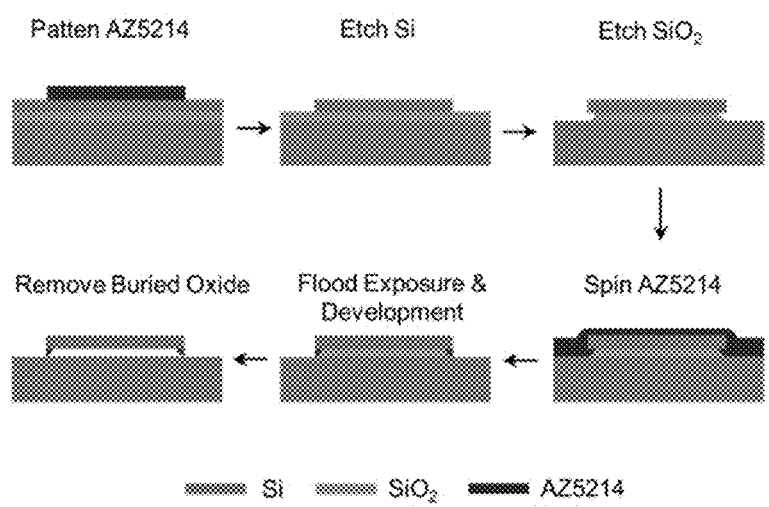
FIG. 26 illustrates fabrication of suspended silicon tiles.

A photonic surface with periodic nanostructures is formed on the top silicon layer of a SOI wafer as shown in the schematics of FIG. 25. A layer of 200 nm thick photocurable epoxy (SU8 2000.5 from MicroChem Corp.; diluted 4% wt. in cyclopentanone) is spin cast at 2000 rpm on a SOI wafer and soft baked for 1 min at 65° C. and 3 min at 95° C.). The SU8 epoxy is then molded by a composite stamp with relief structures of high modulus PDMS (Gelest Corp.) and handle layer of low modulus PDMS (Sylgard 184, Dow Corning) at 95° C. under pressure. Residual SU8 layer in the recessed region is removed by RIE ($O_2$ gas 20 sccm, 50W, 35 mTorr, 1 min). Next, the exposed silicon is etched by RIE ($SF_6$ gas 40 sccm, 100 W, 50 mTorr, 1 min). The remaining SU8 is removed by immersing the sample in a Nano-Strip bath (Cyantek Corp.) for 10 min.

Example 5. Fabrication of Bare Silicon, Black Silicon, and Photonic Crystal Tiles Black silicon and photonic crystal scales are made from SOI wafers (3 µm thick top silicon and 1 µm thick buried oxide, from Ultrasil Corp.) and their top silicon layers are preprocessed as black silicon and photonic crystal surfaces according to procedures described above. Bare silicon tiles with emoji features are also made from preprocessed SOI wafers with lithographically patterned emoji-shaped trenches. After the preprocesses, the top silicon layers are defined in square layouts (390 µm by 390 µm, square packing arrangement, 400 µm center-to-center separation) by photoresist patterning and silicon etching, until the buried oxide layer is exposed, as shown in the schematics of FIG. 26. Immersing the sample in hydrofluoric acid (HF, 49% concentration) for 1 min fully removes the exposed buried oxide and generates undercut trenches below the periphery of the silicon squares. Next, the wafer is coated with a photoresist (AZ5214) during which the undercut trenches are filled with the photoresist. Flood UV exposure and immersion in developer (AZ917 MIF) remove the photoresist everywhere except for the undercut region. Finally, the top silicon tiles are released by immersing in HF for 12 h during which the remaining oxide underneath the top silicon is completely removed. After HF etching, the photoresist under the periphery of top silicon tiles tethers the tiles to the handle layer of the SOI wafer.

Example 6. Transfer Printing of Tiles

Figure 27:
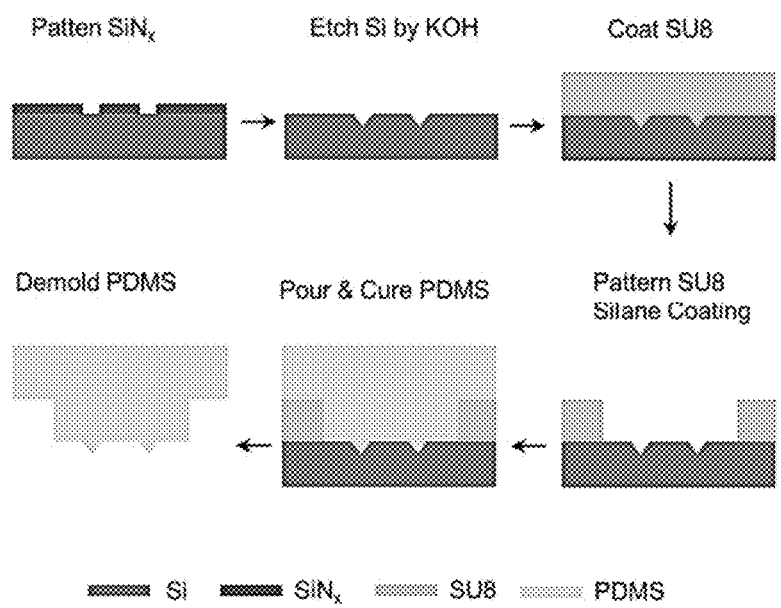
FIG. 27 illustrates fabrication of an elastomeric stamp.

An elastomeric stamp of 2.5 mm by 2.5 mm square post with a pyramidal tip array (8.1 µm tall with 12 by 12 µm square base, 36 µm center-to-center separation) is formed by molding PDMS (Dow Corning, Sylgard 184) on a template composed of a Si wafer with KOH etched pyramidal pits and a SU8 (100 µm thick, SU8 50, MicroChem Corp.) layer with a square opening. Detailed procedures to create the elastomeric stamp are illustrated in FIG. 27.

During transfer printing, as shown in FIGS. 7A-7D, the position of the stamp may be controlled by precision translation and rotational stages. The elastomeric micropillars may be activated by plasma ($O_2$ gas 20 sccm, 50W, 100 mTorr, 20 sec) right before the transfer printing. Bare silicon, black silicon, or photonic crystal tiles, fabricated by previously described processes, may be retrieved by a stamp and printed to the tip of the micropillars. Black silicon surfaces can also be formed after transfer printing bare silicon tiles. The resulting interface between the silicon tile and the elastomeric micropillar may be annealed at 60° C. to yield a strong bond through a hydroxyl condensation reaction between the PDMS and silicon.

Example 7. Bending of Magnetic Micropillars

The elastic torque experienced by a micropillar $T_e$ is linearly dependent on the deflection angle θ by the expression: $T_e = K_{eq}\theta$, where $K_{eq}$ is the equivalent torsion spring constant, determined by the elastic modulus of a micropillar (E~1 MPa), the second moment of inertia I, and the length of pillar L according to $$K_{eq} = c\frac{EI}{L},$$

where c is a correction coefficient. On the other hand, a magnetic material (such as a PDMS matrix including strontium ferrite particles) tends to rotate itself to align with the external magnetic field. A torque is exerted on the micropillar in this process, expressed as: $\vec{T}_m = \vec{m} \times \vec{B}$, where m is the magnetic dipole moment of the magnetic material and B is the external magnetic field. The magnitude of this magnetic field torque is $T_m = mB \sin(\alpha - \theta)$, as ($\alpha - \theta$) indicates the angle between the tilted micropillar and the applied magnetic field at the tip of the tilted micropillar. Magnetic dipole moment for a permanent magnet is obtained by the residual flux density of strontium ferrite ($B_r$~0.2 T) according to $$m = MV_m = \frac{1}{\mu_0} B_r V_m,$$

where M is the magnetization of a magnetic material and $\mu_0$ is the vacuum permeability. The magnetic volume $V_m$ is the volume of particles inside the magnetic micropillar, which can be associated with the weight ratio by $$f_{weight} = \frac{m_{magnet}}{m_{PDMS} + m_{magnet}} = \frac{\rho_{magnet} V_{magnet}}{\rho_{PDMS} V_{PDMS} + \rho_{magnet} V_{magnet}},$$

as $f_{weight}$ can be estimated by energy-dispersion x-ray spectroscopy. In equilibrium, elastic restoring torque balances with the magnetic field torque $T_m = T_e$. Therefore, we get Equation 2:

$$\theta = \frac{V_m MB}{K_{eq}} \sin(\alpha - \theta) \qquad (2)$$

Example 8: Deflection Angle of a Micropillar

Figure 28:
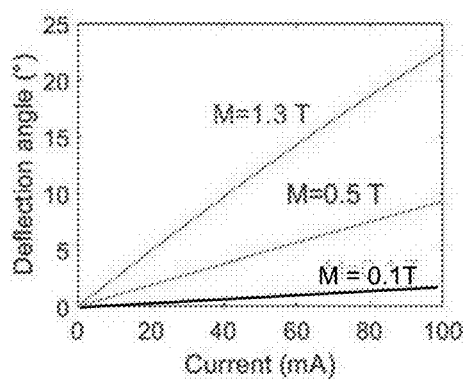
FIG. 28 shows calculated deflection angle of a micropillar as a function of current applied to an adjacent electromagnet for different magnetizations of the ferromagnetic layer on the rigid tile.

The calculated deflection angle of a micropillar as a function of current applied to an adjacent electromagnet is plotted in FIG. 28. In this example, the magnetic hybrid microstructure has a ferromagnetic layer on the rigid tile for different magnetizations of the ferromagnetic film. Assuming a permanent magnet model, the deflection angle, ϕ, of the elastomeric (e.g., PDMS) pillar can be calculated using Equation 3.

$$\phi = \left(\frac{V_m M \mu n I}{K_{eq}}\right) \sin(90° - \phi) \qquad (3)$$

where the $V_m$ is the volume of ferromagnetic layer, M, is the magnitude of magnetization, μ is the permeability, N is the turns per unit meter of coil, and I is the current engaged in coil. The parameters in Table 1 are used for calculation and the calculated result is plotted in FIG. 28. From the result, it can be concluded that hard magnetic layers such as CoNiMnP (M=0.5 T) and NdFeB (M=1.3 T) can be deposited instead of a Ni layer (M<0.1 T) to increase the sensitivity of the hybrid microstructures to the magnetic field from an electromagnet.

TABLE 1

Parameters used for the calculation of equation 3.

| Parameter | Symbol | Value | Unit |
|---|---|---|---|
| Volume of magnet layer | $V_m$ | $1*10^{-12}$ | $m^3$ |
| Magnetization | M | 1.3, 0.5, 0.1 | T |
| Permeability | μ | 0.0628 | $N/A^2$ |
| Solenoid turns per unit meter | n | 60000 | #/m |
| Solenoid current | I | 0-100 | mA |
| Bending stiffness | $K_{eq}$ | $1.145*10^{-9}$ | N*m/rad |

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, ... or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A magnetically-responsive surface structure comprising:

an array of hybrid microstructures on a substrate, each hybrid microstructure comprising an elastomeric micropillar attached to the substrate and a rigid tile attached to the elastomeric micropillar, the rigid tiles collectively defining a discontinuous, changeable surface, and the hybrid microstructures further comprising a ferromagnetic material, wherein the elastomeric micropillars are deflectable under a magnetic field so as to alter an orientation of the rigid tiles, thereby allowing a characteristic of the discontinuous, changeable surface to be manipulated.

2. The magnetically-responsive surface structure of claim 1, wherein the characteristic is selected from the group consisting of wettability, adhesion, light transmittance, and apparent coloration.

3. The magnetically-responsive surface structure of claim 1, wherein the ferromagnetic material is incorporated into or onto the hybrid microstructures.

4. The magnetically-responsive surface structure of claim 3, wherein magnetic particles comprising the ferromagnetic material are embedded in the elastomeric micropillars.

5. The magnetically-responsive surface structure of claim 3, wherein a magnetic film comprising the ferromagnetic material is coated on top and/or bottom surfaces of the rigid tiles.

6. The magnetically-responsive surface structure of claim 1, wherein the array includes at least one hybrid microstructure not comprising the ferromagnetic material, the array thereby including both magnetic and nonmagnetic hybrid microstructures.

7. The magnetically-responsive surface structure of claim 1, wherein the rigid tiles comprise a textured surface, a smooth surface, and/or a periodic patterned surface.

8. The magnetically-responsive surface structure of claim 1, wherein the rigid tiles overhang the elastomeric micropillars.

9. The magnetically-responsive surface structure of claim 1, wherein at least one of the rigid tiles is oriented at a 90° angle with respect to the longitudinal axis of the elastomeric micropillar.

10. The magnetically-responsive surface structure of claim 1, wherein at least one of the rigid tiles is attached to a side surface of the elastomeric micropillar and aligned with a longitudinal axis of the elastomeric micropillar.

11. The magnetically-responsive surface structure of claim 1, wherein the elastomeric micropillars comprise an elastomer selected from the group consisting of: silicone elastomer, polyurethane elastomer, natural rubber, polyethylene-vinyl acetate (PEVA), and/or butyl rubber.

12. The magnetically-responsive surface structure of claim 1, wherein the rigid tiles comprise a material having a Young's modulus greater than about 10 GPa.

13. The magnetically-responsive surface structure of claim 12, wherein the rigid tiles comprise silicon.

14. A method of manipulating properties of a surface, the method comprising:

providing an array of hybrid microstructures on a substrate, each hybrid microstructure comprising an elastomeric micropillar attached to the substrate and a rigid tile attached to the elastomeric micropillar, the rigid tiles collectively defining a discontinuous, changeable surface, the hybrid microstructures further comprising a ferromagnetic material;

applying a magnetic field to the array such that at least one of the elastomeric micropillars deflects under the magnetic field and an orientation of the attached rigid tile is altered, thereby manipulating a characteristic of the discontinuous, changeable surface.

15. The method of claim 14, wherein the characteristic is selected from the group consisting of: wettability, adhesion, light transmission, and apparent coloration.

16. The method of claim 14, wherein providing the array of hybrid microstructures on the substrate comprises transfer printing the rigid tiles onto the elastomeric micropillars.

17. The method of claim 14, wherein the magnetic field is applied collectively to the array.

18. The method of claim 14, wherein the magnetic field is applied selectively to one or more of the hybrid microstructures.

19. The method of claim 14, wherein the magnetic field is applied using a permanent magnet or an electromagnet.

20. The method of claim 14, wherein the array includes at least one hybrid microstructure not comprising the ferromagnetic material and not responding to the magnetic field.

* * * * *